US006953343B2

(12) United States Patent
Townshend

(10) Patent No.: US 6,953,343 B2

(45) Date of Patent: Oct. 11, 2005

(54) AUTOMATIC READING SYSTEM AND METHODS

(75) Inventor: Brent Townshend, Menlo Park, CA (US)

(73) Assignee: Ordinate Corporation, Menlo Park, CA (US)

( * ) Notice: Subject to any disclaimer, the term of this patent is extended or adjusted under 35 U.S.C. 154(b) by 101 days.

(21) Appl. No.: 10/068,457

(22) Filed: Feb. 6, 2002

(65) Prior Publication Data

US 2003/0152894 A1 Aug. 14, 2003

(51) Int. Cl.[7] .................................................. G09B 17/00

(52) U.S. Cl. ........................ 434/178; 434/350; 434/322; 434/184

(58) Field of Search ................................. 434/178, 156, 434/307 R, 317, 320, 321; 704/9, 200

(56) References Cited

U.S. PATENT DOCUMENTS

| | | | | |
|---|---|---|---|---|
| 4,468,204 A | | 8/1984 | Scott et al. | 434/309 |
| 5,059,127 A | | 10/1991 | Lewis et al. | 434/353 |
| 5,268,990 A | | 12/1993 | Cohen et al. | 395/2 |
| 5,303,327 A | | 4/1994 | Sturner et al. | 395/2.79 |
| 5,540,589 A | * | 7/1996 | Waters | 434/156 |
| 5,581,655 A | | 12/1996 | Cohen et al. | 395/2.54 |
| 5,634,086 A | | 5/1997 | Rtischev et al. | 395/2.75 |
| 5,697,793 A | * | 12/1997 | Huffman et al. | 434/317 |
| 5,766,015 A | | 6/1998 | Shpiro | |
| 5,781,879 A | * | 7/1998 | Arnold et al. | 704/9 |
| 5,857,173 A | | 1/1999 | Beard et al. | 704/276 |
| 5,870,709 A | | 2/1999 | Bernstein | 704/275 |
| 6,017,219 A | * | 1/2000 | Adams et al. | 434/178 |
| 6,077,085 A | * | 6/2000 | Parry et al. | 434/322 |
| 6,134,529 A | | 10/2000 | Rothenberg | |
| 6,157,913 A | | 12/2000 | Bernstein | 704/275 |
| 6,299,452 B1 | * | 10/2001 | Wasowicz et al. | 434/178 |
| 6,350,128 B1 | * | 2/2002 | Neuhaus | 434/178 |
| 6,421,524 B1 | * | 7/2002 | Padgett | 434/317 |
| 6,535,850 B1 | * | 3/2003 | Bayya | 704/239 |

FOREIGN PATENT DOCUMENTS

| | | |
|---|---|---|
| WO | WO 98/14934 | 3/1994 |
| WO | WO 94/20952 | 10/1997 |
| WO | WO 99/13446 | 3/1999 |
| WO | WO 01/52231 | 7/2001 |
| WO | WO 01/82264 | 11/2001 |
| WO | WO 02/50803 | 6/2002 |

OTHER PUBLICATIONS

U.S. Appl. No. 09/311,617, filed May 13, 1999, Brent Townshend.

Advance Learning Technologies, 2000. Koun–Ten–Sun, "An effective item selection method for educational measurement," pp. 105–106.

International Search Report for PCT/US03/01667.

Manolis Perakakis, "Distributed Speech Recognition", Technical University of Crete, Online, Jun. 24, 2001.

* cited by examiner

*Primary Examiner*—Chandra L. Harris
*Assistant Examiner*—John Sotomayor
(74) *Attorney, Agent, or Firm*—McDonnell Boehnen Hulbert & Berghoff LLP

(57) ABSTRACT

An automatic reading system provides a system and methods of evaluating a user's reading skills while the user is reading out loud. The automatic reading system adjusts text of an electronic book as the user is reading to increase or decrease a level profile of the electronic book. The automatic reading system also provides reading recommendations, feedback, and marketing data.

64 Claims, 4 Drawing Sheets

AUTOMATIC READING SYSTEM AND METHODS

FIELD

The present invention relates generally to an automatic reading system, and more particularly, relates to an automatic reading system designed to evaluate a user's reading skill profile and adjust an electronic book to the user's reading level. In another embodiment, an automatic reading system recommends other books based on the user's reading level.

BACKGROUND

Teachers and reading specialists may evaluate a student's reading skills while listening to the student reading out loud. Teachers may use a running record system of making notations in the material being read by the student. The notations allow the teacher to duplicate the pauses and reading mistakes made by the student. Based on the teacher's evaluation of the student's reading skills, the teacher may recommend certain books for the student to read.

Books may be "leveled" so that the teacher may choose books appropriate to the reading skills of the student. Initially books were leveled by using a formula based on factors such as the length of words, the length of sentences, the number or density of syllables, or other linguistic elements in the text. More recently, books have been leveled based on the readability of the book in context with the presentation of the material. For example, a long word presented in conjunction with a picture that depicts the word may not be considered as difficult to read as a shorter word without cues from the surrounding text or pictures.

Many schools and learning centers have computer labs located in the classroom or in the library to assist the teacher in evaluating the student's reading skills. The student may be asked to read on-line books or electronic books (e-books), and then be asked to answer questions about what was read. These programs may provide a rating for the student. With this rating, the teacher or the librarian may then make recommendations to the student about other books or e-books that may be appropriate or interesting for the student's reading level.

It would be desirable to have an automatic reading system capable of evaluating a user's reading skills based on the user's performance in reading text out loud. Such a system would allow the user to be evaluated when a teacher or other evaluator was not available to listen to the user.

It would also be desirable to have an automatic reading system that can adjust the text of an e-book to the reading level of the user. For example, if the system detects that the user is easily reading the material, the system may increase the reading difficulty of the text. Conversely, if the user is having trouble reading the text, the system may reduce the reading difficulty of the text.

It would also be desirable to have an automatic reading system that provides feedback and reading recommendations to the user. Instead of the teacher or librarian making a book recommendation to the user, the system may provide a list of books that would be appropriate for the user's reading level. In addition the system may track the user's progress and provide feedback.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

I. Components of a Centrally Located System

Figure 1:
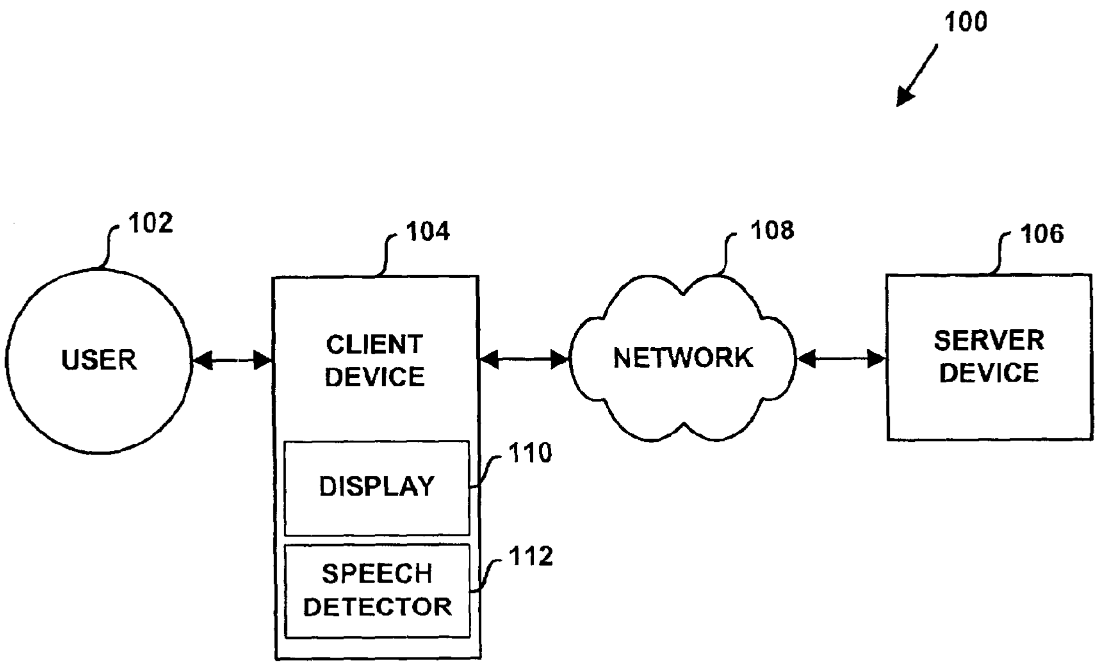
FIG. 1 illustrates a functional diagram of an automatic reading system, according to a first embodiment.

FIG. 1 shows a functional diagram of an automatic reading system 100, according to a first embodiment. The automatic reading system 100 includes a client device 104 and a server device 106. A user 102 may access the client device 104. The user 102 may be, for example, a student (child or adult) in a formal program, someone who is interested in improving his or her reading skills without formal instruction or someone who is merely interested in using technology to improve the reading experience. The user 102 may be learning how to read in any language. The user 102 may be learning how to read for the first time. Alternatively, the user 102 may already know how to read one or more languages, and may be learning how to read an additional language.

A. Client Device

The client device 104 may include a display 110 and a speech detector 112. The client device 104 may be a single device as shown in FIG. 1. Alternatively, the display 110 and the speech detector 112 may be separate devices. The client device 102 preferably contains memory. The client device 104 is shown as a simple rectangular box in FIG. 1 to emphasize the variety of different forms the client device 104 may take on from one embodiment to the next.

The display 110 may be any device or combination of devices that have an ability to display text and/or other graphical or auditory material. The display 110 may include one or more of the following: a wireless handheld device, a personal digital assistant, a monitor or other display device, a personal computer, a digital data reader, or any form of written document, such as book. The display 110 is not limited to any of these devices, and is intended to encompass future communication and information technology.

The speech detector 112 may be any device or combination of devices that have an ability to detect the user 102 reading the text. The speech detector 112 may also convert the speech into electrical signals. For example, the speech detector 112 may include one or more of the following: a telephone, a mobile telephone, a microphone, or a voice transducer. The speech detector 112 is not limited to any of these devices, and is intended to encompass future communication and information technology.

For example, the user 102 may be reading text from the wireless handheld device into the telephone. In another example, the user 102 may be reading an electronic book (e-book) on the screen or monitor of the personal computer that is equipped with the microphone.

The client device 104 may be connected to the server device 106 through a network 108. The network 108 may be a public or a private network. The type of network 108 used may depend upon what type of client device 104 is being employed. For example, the network 108 may be a public switched telephone network (PSTN) if the client device 104 includes a telephone or other plain old telephone service (POTS) capable device. Alternatively, the network 108 may be a packet-switched network, such as the Internet, if the client device 104 includes a personal computer or other packet communication device. The personal computer may also use a PSTN. The network 108 is not limited to these examples and may be any physical and/or wireless network, or combination of networks, that may allow the client device 104 to communicate with the server device 106.

B. Server Device

The server device 106 may be a computer-based system that contains a combination of software, hardware, and/or firmware. The server device 106 may be linked to the network 108. By receiving signals sent from the client device 104, the server device 106 may detect the speech of the user 102 as he or she is reading. The server device 106 may evaluate the reading skills of the user 102 according to one or more reading skill factors. Based on the evaluation, the server device 106 may adjust the reading level of the text being read by the user 102 or provide the user 102 with recommendations of other books to read. The server device 106 may also track the progress of the user 102, rate the user 102 against his or her peers, and provide feedback to the user 102. Additionally, the server device 106 may provide marketing data to publishers or other interested parties. The marketing data may include the types of books the users 102 like to read based on age and other demographics.

Figure 2:
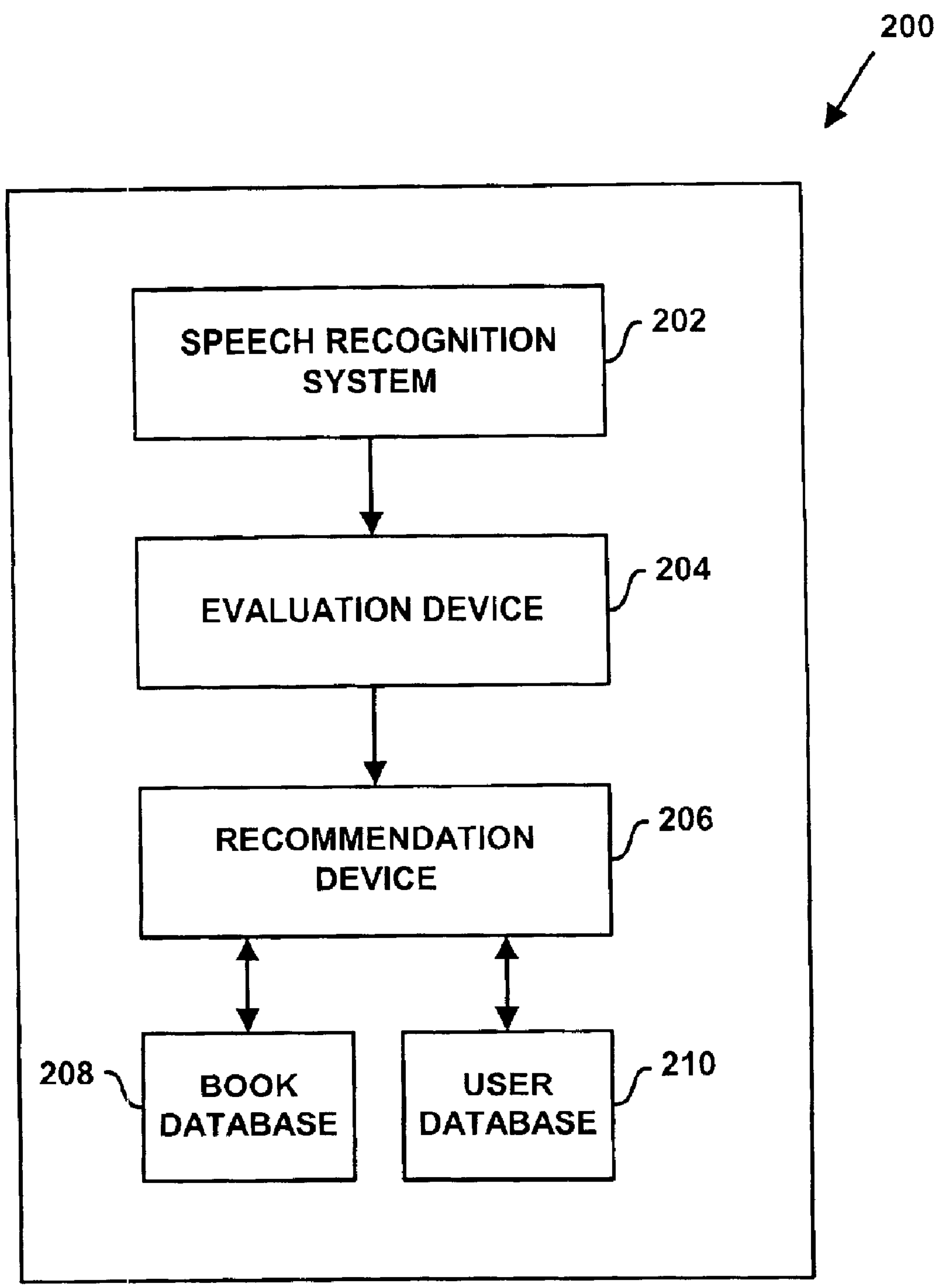
FIG. 2 illustrates a functional diagram of a server device shown in FIG. 1.

FIG. 2 illustrates a functional diagram of a server device 200. The server device 200 may be substantially the same as server device 106 of the automatic reading system 100. The server device 200 may include a network interface for receiving information from and transmitting information to the network. Such network interfaces are well known to those skilled in the art. The server device 200 may include a speech recognition system 202, an evaluation device 204, and a recommendation device 206. The server device 200 may include other components that may be used for evaluating the user's reading skill profile, compiling the evaluation data, and taking action based on the evaluation data.

1. Speech Recognition System

The speech recognition system 202 may be capable of receiving signals representing the speech of the user 102 who is reading the text. The speech recognition system 202 may be implemented in software. Alternatively, the speech recognition system 202 may be a combination of software, hardware, and/or firmware. For example, the speech recognition system 202 may be the HTK software product, which is owned by Microsoft and is available for free download from the Cambridge University Engineering Department's web page (http://htk.eng.cam.ac.uk). The speech recognition system 202 may provide an estimate of linguistic content of the speech to the evaluation device 204.

2. Evaluation Device

The evaluation device 204 may be implemented in software. Alternatively, the evaluation device 204 may be a combination of software, hardware, and/or firmware. The evaluation device 204 may use statistical analysis, such as Item Response Theory, to evaluate the speech estimate provided by the speech recognition system 202. Details on Item Response Theory may be found in "Introduction to Classical and Modern Test Theory," authored by Linda Crocker and James Algina, Harcourt Brace Jovanovich College Publishers (1986), Chapter 15; and "Best Test Design; Rasch Measurement," by Benjamin D. Wright and Mark H. Stone, Mesa Press, Chicago, Ill. (1979), the contents of both of which are incorporated herein by reference.

The evaluation device 204 may include a response database. The response database may include a correct response for the text in each book that is to be read into the automatic reading system 100. The response database may be located within the evaluation device 204 or may be located elsewhere within the server device 200. Alternatively, the response database may be located externally from the server device 200, but accessible to the evaluation device 204.

The correct response may be statistically determined from sample responses provided by sample speakers. The sample responses may represent the correct reading of the text. The evaluation device 204 may provide the recommendation device 206 an evaluation of the user's reading skill profile by comparing the user's reading of the text with the correct response. The response database may be updated as more users use the automatic reading system 100. The response database may also be updated to incorporate more text.

U.S. patent application Ser. No. 09/311,617, titled "Automated Language Assessment Using Speech Recognition Modeling," which is assigned to the same assignee as the present invention, describes a preferred system of evaluating speech. In U.S. patent application Ser. No. 09/311,617, the contents of which are incorporated herein by reference, a scoring device converts an estimate of speech into an item score. Other speech evaluation systems, known to those skilled in the art, may alternatively be used.

3. Recommendation Device

The recommendation device 206 may be implemented in software. Alternatively, the recommendation device 206 may be a combination of software, hardware, and/or firmware. The recommendation device 206 may adjust the level profile of the e-book that the user 102 is reading and/or provide a recommendation for additional materials to read. In accordance with a preferred embodiment, the recommendation device 206 provides real-time adjustment to the text presented to the user 102 based upon the output of the evaluation device 204. The recommendation device 206 may also provide feedback to the user 102 and marketing data to publishers and other interested parties. The recommendation device 206 may use the network interface for receiving information from and transmitting information to the network.

The recommendation device 206 may access at least one database. The at least one database may be located within the server device 200, as shown in FIG. 2, or may be located external to the server device 200. Alternatively, the at least one database may be co-located within one of the subsystems of the server device 200.

The at least one database may include a book database 208. The book database 208 may contain several versions of the same book. The different versions of the book may be appropriate for different reading levels. The book database 208 may include a memory pointer capable of tracking where, in each version of the book, the user 102 is reading. Each book in the book database 208 preferably contains linkage points. The recommendation device 206 may switch from one version of the book at a first level profile, to another version of the book, at a different level profile, based on the user's reading skill profile using the linkage points.

The at least one database may also include a user database 210. The user database 210 may contain data for users that have used the automatic reading system 100. The user data may include user identification, a history of previous evaluations, and a history of books read. The user database 210 may also contain user preferences and responses to questions presented by the automatic reading system 100.

The user database 210 may also include a combined rating for all the users using the automatic reading system 100. The combined rating may include a multitude of factors that may be used to adjust the level profile of a book. For example, the level profile of the book may be decreased if the combined rating demonstrates that the users easily read the book in comparison with other books at the same level profile. The combined rating may also be used to derive the level profile of another book. For example, by comparing the user's ability to read a book that has not been leveled with user data stored in the user database 210, the automatic reading system 100 may derive a level profile of the book.

II. Components of a Stand-alone System

Figure 3:
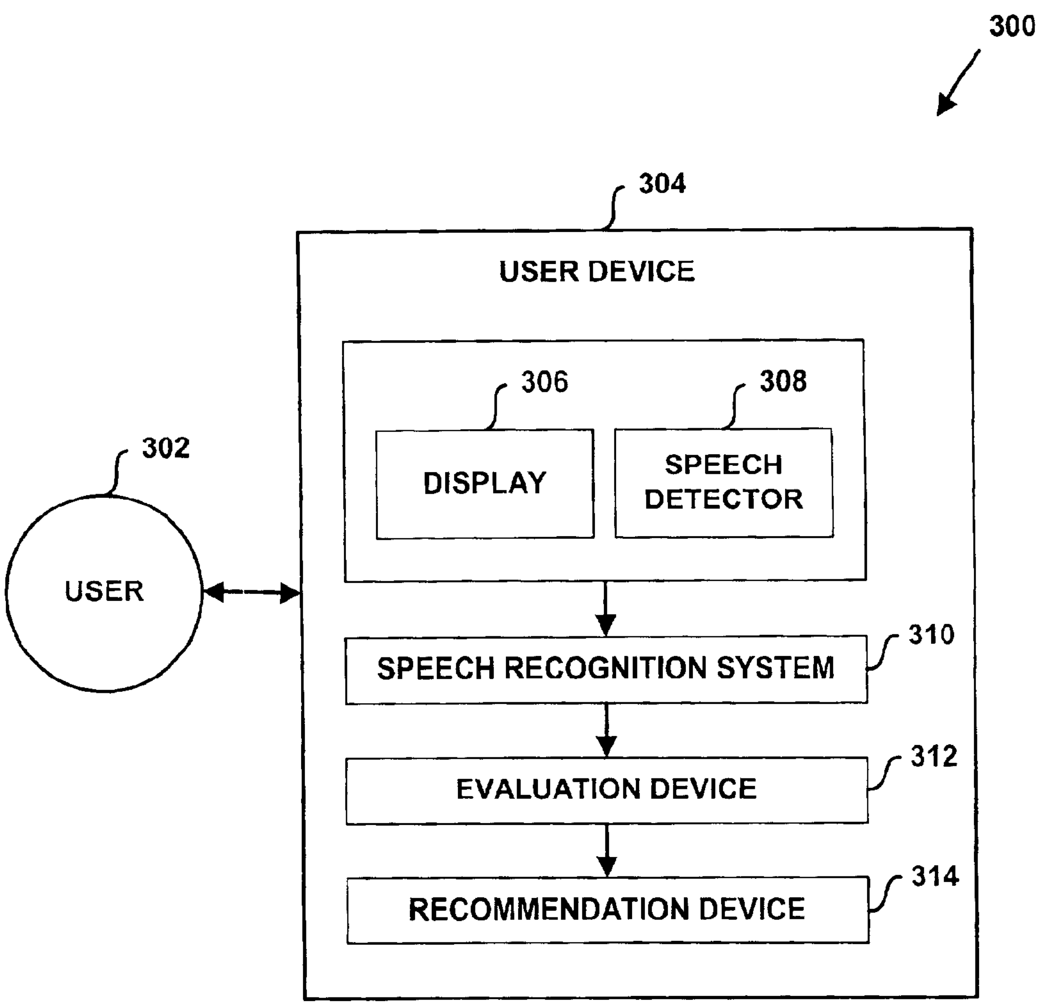
FIG. 3 illustrates a functional diagram of an automatic reading system, according to another embodiment.

FIG. 3 illustrates a functional diagram of an automatic reading system 300, according to another embodiment. The automatic reading system 300 includes a user device 304, which preferably includes substantially all of the functions, other than the network interfaces, of the client device 104 and the server device 106 in the automatic reading system 100 (See FIG. 1). In an alternative embodiment, the user device 304 may include a network interface for providing evaluation and/or recommendation information to a server. The user 302 may have access the user device 304. The user 302 may be substantially the same as the user 102 of the automatic reading system 100.

The user device 304 may include a display 306, a speech detector 308, a speech recognition system 310, an evaluation device 312, and a recommendation device 314. The display 306 and the speech detector 308 may be substantially the same as the display 110 and the speech detector 112 of the automatic reading system 100. The speech recognition system 310, evaluation device 312, and the recommendation device 314 may be substantially the same as the speech recognition system 202, evaluation device 204, and the recommendation device 206 of the server device 200.

By incorporating substantially all of the functions of the client device 104 and the server device 106 into the user device 304, the automatic reading system 300 may be a stand-alone system. The stand-alone system may, for example, be used in a school district setting where it may be customized to the students and the books located within the school district.

In another embodiment, the user system 304 may be located entirely on an e-book. By providing the user system 304 on an e-book, the user 302 may continuously read the various levels of the e-book until he or she has mastered the most difficult version, similar to a computer game. The user 302 may then start reading a more difficult book on the automatic reading system 300.

III. Operation of Automatic Reading System

Figure 4:
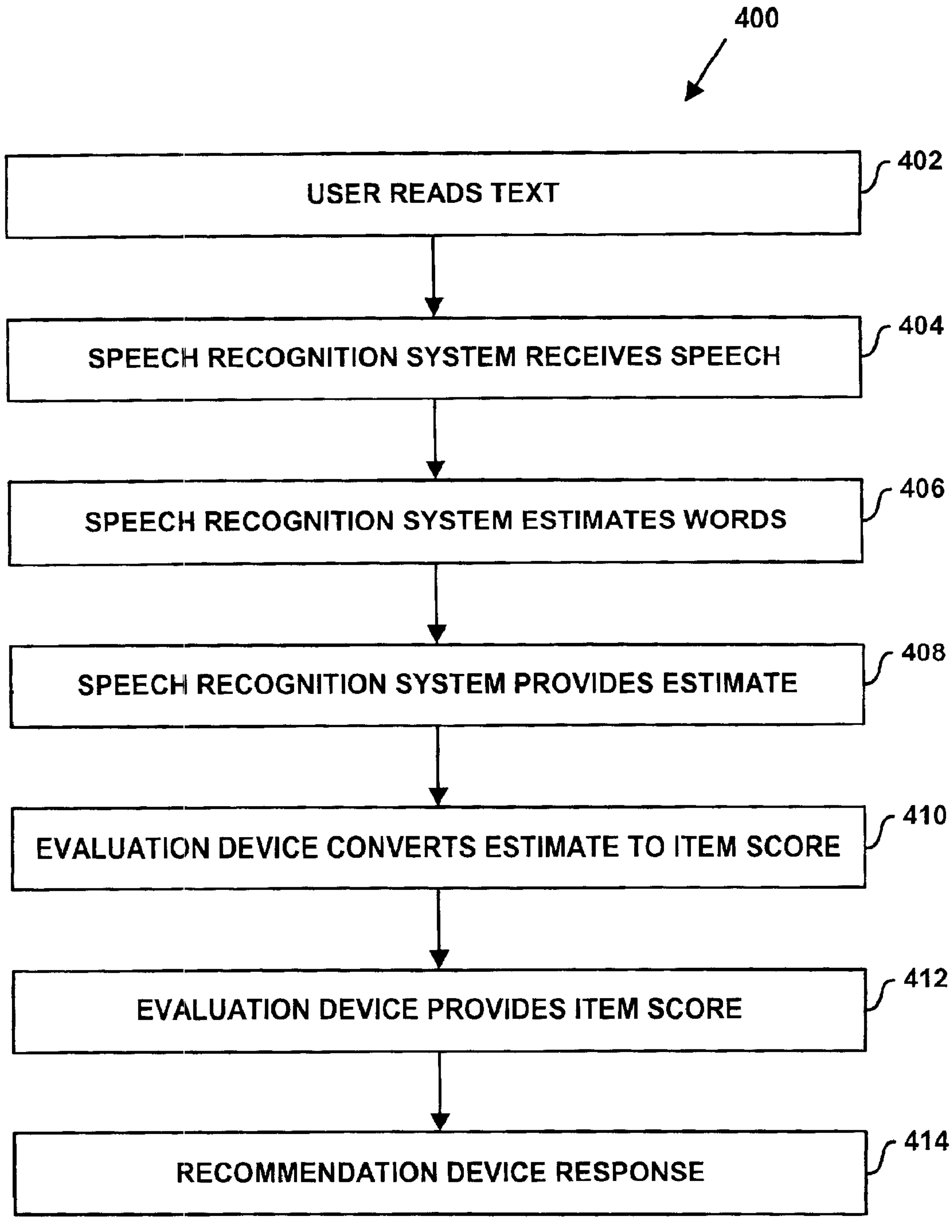
FIG. 4 is a simplified flow diagram of an automatic reading method, according to an embodiment.

FIG. 4 shows a simplified flow diagram illustrating a method 400 for using the automatic reading system. The method 400 assumes that the user has already accessed the automatic reading system and the system is ready to evaluate the user's reading skill profile. The user may have to perform several steps prior to the system being ready. For example, the user may have already turned on the client device 104 or the user device 304 and provided the automatic reading system with a user identification code. In addition, the user may have selected an e-book from the automatic reading system to read, or provided the system with a book identification code so the system knows what book and/or page the user is reading.

Step 402 provides that the user reads the text. In a preferred embodiment, the text may be presented from a book or an e-book. However, other forms of text may be read. It should be understood that the user is reading out loud, such that the speech detector can detect that the user is reading. In the automatic reading system 100, the user 102 may read text from the display 110. In the automatic reading system 300, the user 302 may read text from display 306.

Step 404 provides that the speech recognition system receives the speech. In automatic reading system 100, the speech detector 112 may detect the speech, convert the speech into electrical signals, and transfer the speech over the network 108 to the speech recognition system 202 located on the server device 106. In automatic reading system 300, the speech detector 308 may detect the speech, convert the speech into electrical signals, and transfer the speech to the speech recognition system 310. Once the speech has been transferred to the speech recognition system, the automatic reading system 100 may operate substantially the same as the automatic reading system 300. Unless specified otherwise, the remaining details of the method 400 will be described referencing the automatic reading system 100 with the understanding that the method 400 for the automatic reading system 300 is substantially the same.

Step 406 provides that the speech recognition system estimates the speech. The speech recognition system 202 may use a Hidden Markov Model (HMM) to sample and process the speech; however, other speech recognition techniques may also be employed. Speech recognition systems are well known in the art. For example, U.S. Pat. No. 5,581,655, issued to SRI International, describes such a speech recognition system.

Step 408 provides that the speech recognition system provides the estimate of the speech to the evaluation device. The estimate may be an estimate of the linguistic content of the speech and may be in the form of a data stream that represents the user's speech. For example, the output of the speech recognition system 202 may be a sequence of words in a machine recognizable format, such as American Standard Code for Information Interchange (ASCII).

Step 410 provides that the evaluation device converts the estimate to an item score. The evaluation device 204 may use Item Response Theory to convert the estimate into the item score; however, other statistical models may also be used. The evaluation device 204 may convert the estimate into the item score by tracking the number of insertions, deletions, and substitutions needed to convert the speech into a correct response. Other factors may also be tracked, such as pauses and stretching out letters or sounds, which indicate that the user 102 is having difficulty reading the text.

The correct response may be a sample provided by sample speakers that represents the correct reading of the text. The correct response may initially be determined using a number of speakers reading the text correctly. The correct response may be updated as more users use the automatic reading system 100. Alternatively, the correct response may be based upon the text itself.

The item score may be the total number of differences between the user's speech and the correct response. Alternatively, the item score may include more than one score representing a multitude of reading skill factors. The reading skill factors may include the user's sight reading skill, decoding skill, vocabulary level, listening comprehension, language proficiency, phonological awareness, and other factors that may be determined by the automatic reading system 100.

Step 412 provides that the evaluation device provides the item score to the recommendation device. The item score may be in the form of a number, representing the number of errors that the user 102 made while reading the text. Alternatively, the item score may be a series of numbers representing different reading skill factors. While the use of numbers may be preferred, other identification codes may also be employed.

Step 414 provides that the recommendation device responds. The recommendation device 206 may be capable of performing several functions based on the item score. If the user 102 is reading from an e-book, the recommendation device 206 may adjust the text of the e-book to the reading level of the user 102. The recommendation device 206 may also provide the user 102 with recommendations of other books to read, provide feedback to the user 102, and/or provide marketing data.

A. Adjusting the Level Profile of an E-book

The recommendation device 206 may adjust the level profile of the e-book as the user 102 is reading. The adjustment may either be to increase the level profile of the book for the user 102 that is reading easily or decreasing the level profile of the book if the user 102 is struggling with the text. The adjustment may be made based on the item score. The adjustment may be made based on one or more reading skill factors. However, not all embodiments may be capable of providing this function. For example, if the user 102 reads from a book over the telephone, the automatic reading system 100 may not be able to change the version of the book that the user 102 is reading.

The recommendation device 206 may have access to a book database 208. The book database 208 may contain several versions of a book. The several versions may have different level profiles for different reading levels. The book database 208 may include a memory pointer capable of tracking where, in each version of the book, the user 102 is reading. Each book in the book database 208 may contain linkage points. The recommendation device 206 may switch from one version of the book to another version of the book based on the user's reading skill profile using the linkage points.

For example, the user 102 has accessed the server device 106 using a personal computer with a microphone. The user 102 has selected or been assigned an e-book with a particular reading level from the server device 106. The server device 106 displays the e-book on the computer's monitor. As the user 102 reads the e-book into the microphone, the server device 106 tracks the location where the user 102 is reading in multiple versions of the e-book. If the user 102 makes many errors and pauses between words, such that the item score falls below a predetermined threshold, the server device 106 may switch to another version of the e-book at a linkage point. The user 102 may or may not be aware that the version has been switched. The server device 106 may continue to monitor the reading of the user 102 and make adjustments as needed.

B. Recommendations

The recommendation device 206 may provide the user 102 with a recommendation of books to read. The recommendation may be based on the user's reading skill profile as evaluated by the automatic reading system 100. The recommendation may also be based on the type of book selected by the user 102 to read into the system 100.

The recommendations may be provided to the user 102 in a text format, such as on a computer screen or on a handheld device. Recommendations may be printed on a printer attached to the client device 104. Alternatively, if the user has used a phone to access the server device 106, the server device 106 may provide a verbal recommendation.

For example, the user 102 calls a predetermined phone number to access the server device 106. The user 102 enters his or her user identification number and the identification number of the book that will be read. The user 102 may read the book into the phone. The user 102 may begin reading from anywhere within the book. Alternatively, the user 102 may indicate to the automatic reading system 100 where he or she will begin reading. The server device 106 may evaluate the user's ability to read the text. Based on this evaluation the server device 106 may provide a verbal recommendation of other books to read.

In addition, the server device 106 may make selections based upon the user's reading preferences. For example, if the user 102 has previously selected books about animals, the server device 106 may recommend other books at the user's reading level that are about animals. The server device 106 may obtain user preferences from the user database 210.

C. Feedback

The automatic reading system 100 may provide feedback to the user 102, a teacher, a professional, or other evaluator. The server device 106 may store data collected while the user is connected to the automatic reading system 100 in a user database 210. Using the user's historical data, the feedback may include a progress report for the user 102. The progress report may include feedback based upon the reading skill factors. The user 102 may see how his or her reading skill profile has improved over time. The feedback may also include information regarding how the user 102 ranks against his or her peers. The feedback may be provided on a periodic basis, such as once a month.

The feedback may be provided to the user 102 in a text format, such as on a computer screen or on a handheld device. Feedback may be printed on a printer attached to the client device 104. Alternatively, if the user has used a phone to access the server device 106, the server device 106 may provide verbal feedback.

D. Marketing

The automatic reading system 100 may collect data in the user database 210 that may be useful for marketing applications. For example, the automatic reading system 100 may collect information regarding what types of books the user 102 selects to read into the system 100. When the user enters the automatic reading system 100, the system may ask the user 102 a series of questions. For example, a question may be whether or not the user 102 enjoyed reading the book.

Publishers and other interested parties may be able to use this information to target other readers. For example, a publisher that mails catalogs or provides on-line services may be able to recommend certain books for certain levels of reading skills to their customers. Web pages may be designed to lead consumers to preferred books or other appropriate reading materials. Particular customers may be targeted with specific books based on the data collected by the automatic reading system 100.

The automatic reading system provides a system that may improve the user's reading skills. By analyzing the user's speech while the user is reading out loud, the automatic reading system may adjust the text of an e-book, provide reading recommendations, and/or provide feedback to the user in the form of progress reports and comparisons with peers. The automatic reading system may be used when a teacher or other evaluator is not available to listen to the user. Users that are uncomfortable reading out loud in front of others may also prefer using the automatic reading system.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

I claim:

1. An automatic reading system, comprising in combination:

means for detecting speech of a user who is reading out loud;

means for evaluating the user's reading skill based on an output of a speech recognizer that is coupled to the detecting means, wherein the evaluating means computes a score based on factors extracted from the output of the speech recognizer and at least one correct response, wherein the factors are selected from the group consisting of insertions, deletions, substitutions, pauses, stretching out letters, and stretching out sounds, and wherein the at least one correct response is determined from sample responses provided by sample speakers; and means for making recommendations of books to read based on the evaluating means.

2. The system at claim 1, wherein the user is reading out loud from a book and further comprising means for adjusting a difficulty level profile of the book based on the evaluating means.

3. The system of claim 2, wherein the book is an electronic book.

4. The system of claim 1, further comprising means for providing feedback on the user.

5. The system of claim 4, wherein the feedback is a progress report.

6. The system of claim 4, wherein the feedback is a comparison with peers.

7. The system of claim 1, further comprising means for providing marketing data.

8. An automatic reading system, comprising in combination:

a speech recognition system operable to provide an estimate of speech;

an evaluation device operable to convert the estimate of speech into a score based on factors extracted from the estimate of speech and at least one correct response, wherein the at least one correct response is determined from sample responses provided by sample speakers; and a recommendation device operable to use the score to provide a recommendation of books to read.

9. The system of claim 8, wherein the speech recognition system estimates linguistic content of the speech.

10. The system of claim 8, wherein the estimate of speech is a sequence of words in a machine recognizable format.

11. The system of claim 10, wherein the machine recognizable format is ASCII.

12. The system of claim 8, wherein the evaluation device includes a response database.

13. The system of claim 12, wherein the response database includes the at least one correct response.

14. The system of claim 8, wherein the score is calculated using Item Response Theory.

15. The system of claim 8, wherein the score is a number of differences between the estimate of speech and the at least one correct response.

16. The system of claim 8, wherein a user is reading from an electronic book and the recommendation device is operable to use the score to adjust a difficulty level profile of the electronic book.

17. The system of claim 8, wherein the recommendation device is operable to provide feedback to a user.

18. The system of claim 8, wherein the recommendation device is operable to provide marketing data.

19. The system of claim 8, wherein the recommendation device accesses at least one database.

20. The system of claim 19, wherein the at least one database includes a book database.

21. The system of claim 20, wherein the book database contains several versions of a book.

22. The system of claim 21, wherein the several versions of the book include versions of the book with different difficulty level profiles.

23. The system of claim 20, wherein the book database contains a memory pointer capable of tracking in several versions of a book where a user is reading.

24. The system of claim 23, wherein the several versions of the book contain linkage points.

25. The system of claim 24, wherein the recommendation device uses the linkage points to switch between the several versions of the book.

26. The system of claim 19, wherein the at least one database includes a user database.

27. The system of claim 26, wherein the user database includes data selected from the group consisting of user identification, history of evaluations, history of books read, user preferences, and responses to questions.

28. The system of claim 8, wherein the factors include the number of insertions, deletions, and substitutions needed to convert the output of the speech recognizer into the correct response.

29. The system of claim 8, wherein the factors include pauses, stretching out letters, and stretching out sounds.

30. An automatic reading system, comprising in combination:

a speech recognition system operable to provide an estimate of linguistic content of speech, and wherein the estimate is a sequence of words in a machine recognizable format;

an evaluation device operable to convert the estimate of the linguistic content of speech into an item score by tracking a number of insertions, deletions, and substitutions needed to convert the speech into at least one correct response, wherein the item score is calculated using Item Response Theory, and wherein the at least one correct response is determined from sample responses provided by sample speakers; and a recommendation device operable to use the item score to provide a recommendation of books to read wherein the recommendation device accesses a book database containing several versions of a book, and wherein the recommendation device accesses a user database.

31. The system of claim 30, wherein a user is reading out loud from an electronic book and the recommendation device is operable to use the item score to adjust a difficulty level profile of the electronic book.

32. The system of claim 30, wherein the recommendation device is operable to provide feedback to a user.

33. The system of claim 30, wherein the recommendation device is operable to provide marketing data.

34. A method of providing an automatic reading system, comprising in combination:

reading text into a speech detector;

estimating linguistic content of the text as read, wherein the estimate is a data stream that represents a user's speech;

converting the estimate into a score based on factors extracted from the estimate and at least one correct response, wherein the at least one correct response is determined from sample responses provided by sample speakers; and providing a recommendation of books to read based on the score.

35. The method of claim 34, wherein the user is reading out loud from an electronic book and further comprising adjusting a difficulty level profile of the electronic book.

36. The method of claim 34, further comprising providing feedback to the user.

37. The method of claim 34, further comprising providing marketing data.

38. The method of claim 34, wherein the speech detector converts speech into electrical signals.

39. The method of claim 38, wherein a speech recognition system uses the electrical signals to estimate the linguistic content of speech.

40. The method of claim 34, wherein the score is calculated using Item Response Theory.

41. The method of claim 34, wherein the score is a number of differences between the estimate of linguistic content and the at least one correct response.

42. The system of claim 34, wherein the factors include the number of insertions, deletions, and substitutions needed to convert the output of the speech recognizer into the correct response.

43. The system of claim 34, wherein the factors include pauses, stretching out letters, and stretching out sounds.

44. An automatic reading system, comprising in combination:

a client device including a display and a speech detector; and a server device operable to detect speech from a user reading from a book presented on the display, wherein the server device evaluates the speech based on factors extracted from the detected speech and at least one correct response, wherein the factors comprise at least one of insertions, deletions, and substitutions needed to convert a response from the user into the at least one correct response, wherein the at least one correct response is determined from sample responses provided by sample speakers, and wherein the server device provides recommendations of books to read to the user.

45. The system of claim 44, wherein the display is a device selected from the group consisting of a wireless handheld device, a personal digital assistant, a monitor, a personal computer, a digital date reader, an electronic book, and a document.

46. The system of claim 44, wherein the speech detector is a device selected from the group consisting of a telephone, a mobile telephone, a microphone, and a voice transducer.

47. The system of claim 44, wherein the client device communicates with the server device using a network.

48. The system of claim 47, wherein the network is a public switched telephone network.

49. The system of claim 47, wherein the network is a packet-switched network.

50. The system of claim 44, wherein the server device adjusts a difficulty level profile of an electronic book while the user is reading the electronic book.

51. The system of claim 44, wherein the server device provides feedback to the user.

52. The system of claim 44, wherein the server device provides marketing data.

53. An automatic reading system, comprising in combination;

a database of electronic books;

a client device associated with the database, wherein the client device includes a display and a speech detector; and a recommendation module associated with at least one of the client device and the database, wherein the recommendation module recommends electronic books from the database based upon a calculated user's reading level, wherein the user's reading level is determined by computing a score based on factors extracted from a user's response and at least one correct response, wherein the factors comprise at least one of insertions, deletions, and substitutions needed to convert the user's response into the at least one correct response, and wherein the at least one correct response is determined from sample responses provided by sample speakers.

54. An automatic reading system that adjusts text of an electronic book to match a user's reading level, comprising in combination:

a speech recognition system operable to provide an estimate of speech;

an evaluation device operable to convert the estimate of speech into a score; and a recommendation device operable to use the score to adjust a difficulty level profile by adjusting the text of an electronic book while a user of the automatic reading system is reading the electronic book.

55. The system of claim 54, wherein the recommendation device accesses at least one database.

56. The system of claim 55, wherein the at least one database includes a book database.

57. The system of claim 56, wherein the book database contains several versions of a book.

58. The system of claim 57, wherein the several versions of the book include versions of the book with different difficulty level profiles.

59. The system of claim 56, wherein the book database contains a memory pointer capable of tracking in several versions of a book where a user is reading.

60. The system claim 59, wherein the several versions of the book contain linkage points.

61. The system of claim 60, wherein the recommendation device uses the linkage points to switch between the several versions of the book.

62. A method of providing an automatic reading system that adjusts text of an electronic book to match a user's reading level, comprising in combination:

reading text from an electronic book out loud into a speech detector;

estimating linguistic content of the text as read;

converting the estimate into a score; and adjusting a difficulty level profile by adjusting the text of the electronic book in accordance with the score while the electronic book is being read.

63. An automatic reading system that adjusts text of an electronic book to match a user's reading level, comprising in combination:

a client device including a display and a speech detector; and a server device operable to detect speech from a user reading out loud from an electronic book, wherein the server device evaluates the speech, and wherein the server device adjusts a difficulty level profile by adjusting the text of the electronic book while the user is reading the electronic book.

64. An automatic reading system that adjusts text of an electronic book to match a user's reading level comprising in combination:

a database of electronic books;

a client device associated with the database, wherein the client device includes a display and a speech detector; and a recommendation module associated with at least one of the client device and the database, wherein the recommendation module adjusts a difficulty level profile by adjusting the text of the electronic books based upon a user's reading level while the electronic books are being read by a user of the automatic reading system.

* * * * *